(12) United States Patent
Lee et al.

(10) Patent No.: US 10,840,016 B2
(45) Date of Patent: Nov. 17, 2020

(54) CAPACITOR COMPONENT

(71) Applicant: SAMSUNG ELECTRO-MECHANICS CO., LTD., Suwon-si (KR)

(72) Inventors: Min Gon Lee, Suwon-si (KR); Seung Woo Song, Suwon-si (KR); Won Young Lee, Suwon-si (KR); Jin Man Jung, Suwon-si (KR); Taek Jung Lee, Suwon-si (KR); Jin Kyung Joo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 5 days.

(21) Appl. No.: 16/207,025

(22) Filed: Nov. 30, 2018

(65) Prior Publication Data

US 2020/0126719 A1  Apr. 23, 2020

(30) Foreign Application Priority Data

Oct. 17, 2018 (KR) .......................... 10-2018-0123955

(51) Int. Cl.
| | |
|---|---|
| *H01G 4/30* | (2006.01) |
| *H01G 2/06* | (2006.01) |
| *H01G 4/012* | (2006.01) |
| *H01G 4/12* | (2006.01) |

(52) U.S. Cl.
CPC ............. *H01G 2/065* (2013.01); *H01G 4/012* (2013.01); *H01G 4/12* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 9,552,927 | B2 * | 1/2017 | Sasaoka | H01G 4/30 |
| 2014/0307362 | A1 * | 10/2014 | Kim | H01G 4/12 |
| | | | | 361/301.4 |
| 2015/0021073 | A1 * | 1/2015 | Kim | H01G 4/30 |
| | | | | 174/258 |
| 2015/0116901 | A1 * | 4/2015 | Sasaoka | H01G 4/30 |
| | | | | 361/301.4 |
| 2019/0164693 | A1 * | 5/2019 | Ono | H01G 4/224 |

FOREIGN PATENT DOCUMENTS

| | | |
|---|---|---|
| JP | H07-183154 A | 7/1995 |
| JP | 2005-259772 A | 9/2005 |

* cited by examiner

*Primary Examiner* — Dion Ferguson
(74) *Attorney, Agent, or Firm* — Morgan, Lewis & Bockius LLP

(57) ABSTRACT

A capacitor component includes a body including a dielectric layer, and a first internal electrode and a second internal electrode opposing each other in a first direction of the body with the dielectric layer interposed therebetween, and having first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body, and first and second external electrodes disposed in the body and connected to the first and second internal electrodes, respectively. The body has edges having a rounded shape.

11 Claims, 3 Drawing Sheets

III–III'

CAPACITOR COMPONENT

CROSS-REFERENCE TO RELATED APPLICATION(S)

This application claims benefit of priority to Korean Patent Application No. 10-2018-0123955 filed on Oct. 17, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC) is a chip-type condenser mounted on the printed circuit substrates of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity, while being easily installed. As electronic devices such as computers, mobile devices, and the like, are miniaturized and increased in power, there has been increased demand for miniaturized and high capacity multilayer ceramic capacitors.

Recently, as the mounting density of a substrate has increased, a multilayer ceramic capacitor has been required to have a reduced mounting area, and there has been increased demand for a low-profile multilayer ceramic capacitor having a reduced thickness to embed the capacitor in a substrate or to mount in a lower portion of an application processor (AP) as a land-side capacitor (LSC).

A low-profile multilayer ceramic capacitor may reduce an equivalent series inductance (ESL) generated in a substrate, as well as reducing a mounting area. Thus, the market for a low-profile multilayer ceramic capacitor will continue to be expanded.

Meanwhile, there has been an issue of chipping defects, breakage of edges of chips caused by collisions between chips during the process of manufacturing a multilayer ceramic capacitor. Such chipping defects may cause exterior defects and degradation of moisture resistance reliability.

In the prior art, edges of a body have been ground to be round to prevent chipping defects.

However, a low-profile multilayer ceramic capacitor may be vulnerable to chipping defects as it has a low thickness. Thus, if a general method of grinding edges to be rounded is applied to the multilayer ceramic capacitor, the issues of exterior defects, degradation of moisture resistance reliability, and the like, may arise. Thus, it has become necessary to develop an appropriate method while addressing the issues.

SUMMARY

An aspect of the present disclosure is to provide a capacitor component having a structure capable of preventing chipping defects.

According to an aspect of the present disclosure, a capacitor component includes a body including a dielectric layer, and a first internal electrode and a second internal electrode opposing each other in a first direction of the body with the dielectric layer interposed therebetween, and having first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body, and first and second external electrodes disposed in the body and connected to the first and second internal electrodes, respectively. The body has edges having a rounded shape. $R_{LW}$ is greater than $R_{LT}$, and $R_{LW}$ and $R_{LT}$ satisfy $2.5*T/R_{LT} \le R_{LW} \le 0.25*W$, in which $R_{LW}$ is defined as a radius of curvature of an edge of a surface of the body in the second and third directions, $R_{LT}$ is defined as a radius of curvature of an edge of a surface of the body in the first and second directions, T is defined as a distance between the first and second surfaces of the body, and W is defined as a distance between the fifth and sixth surfaces of the body.

According to an exemplary embodiment, a ratio between W and T, W/T, may be defined as an aspect ratio, and the aspect ratio may be 4 or greater.

According to an exemplary embodiment, T may be 100 μm or less.

According to an exemplary embodiment, $R_{LW}$ and $R_{LT}$ may satisfy $2 \le R_{LW}/R_{LT} \le 100$.

According to an exemplary embodiment, T, $R_{WT}$, and $R_{LW}$ may satisfy $2.5*T/R_{WT} \le R_{LW}$, in which $R_{WT}$ is defined as a radius of curvature of an edge of a surface of the body in the first and third directions.

According to an exemplary embodiment, $R_{WT}$ and $R_{LT}$ may satisfy $0.9 \le R_{WT}/R_{LT} \le 1.1$.

According to an exemplary embodiment, when a distance L between the third and fourth surfaces of the body may be 1000 μm or less, and W may be 500 μm or less.

According to an exemplary embodiment, the first external electrode may be disposed on the third surface of the body, and the second external electrode may be disposed on the fourth surface of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
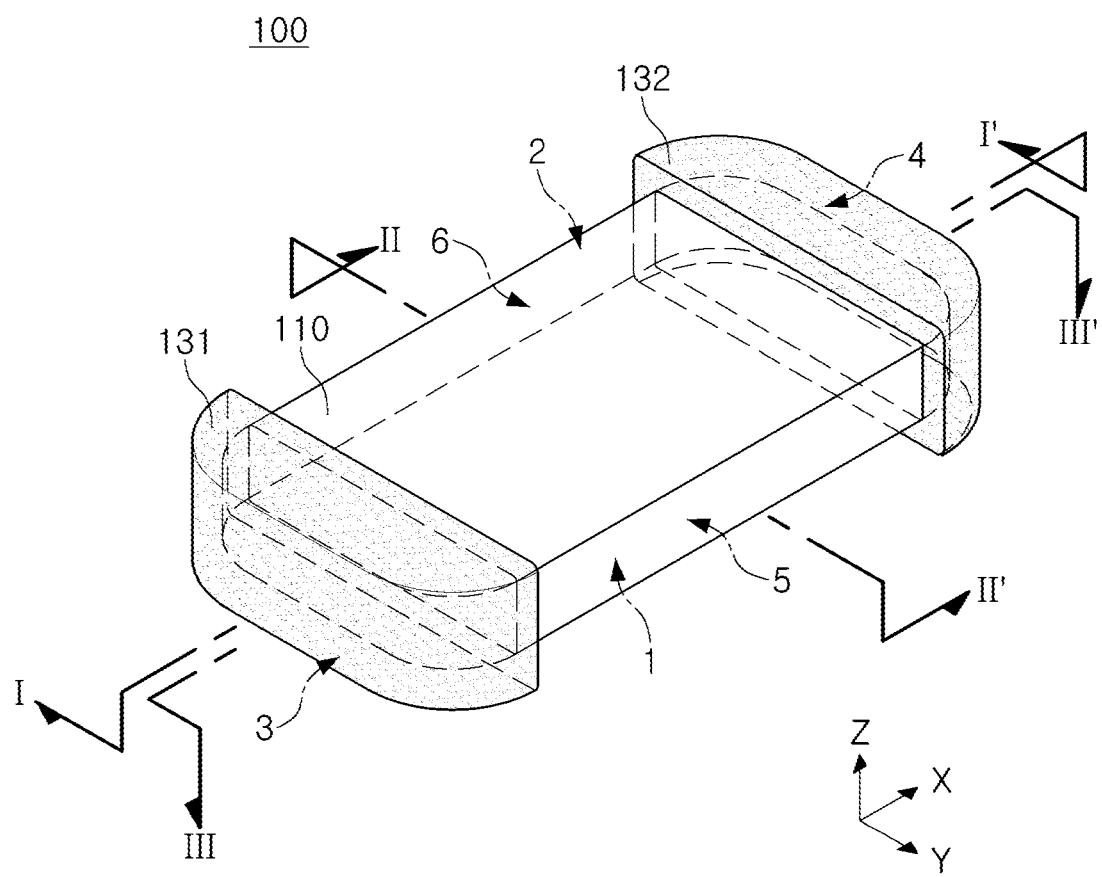
FIG. 1 is a schematic diagram illustrating a capacitor component according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

In the drawings, certain elements may be omitted to clearly describe the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, the same as a T direction, or a thickness direction.

Capacitor Component

FIG. 1 is a schematic diagram illustrating a capacitor component according to an exemplary embodiment.

Figure 2:
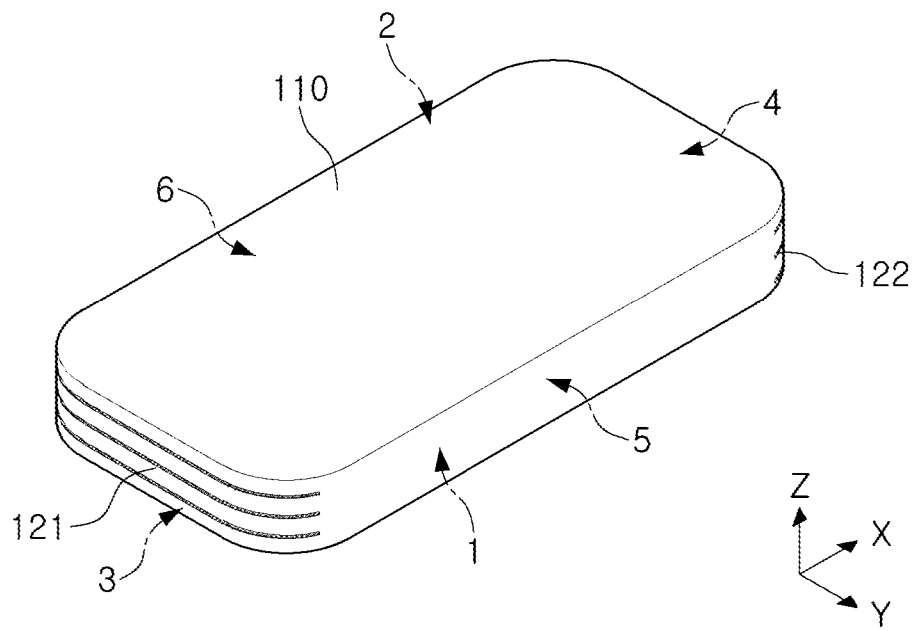
FIG. 2 is a schematic diagram illustrating a body in FIG. 1.

FIG. 2 is a schematic diagram illustrating a body in FIG. 1.

Figure 3:
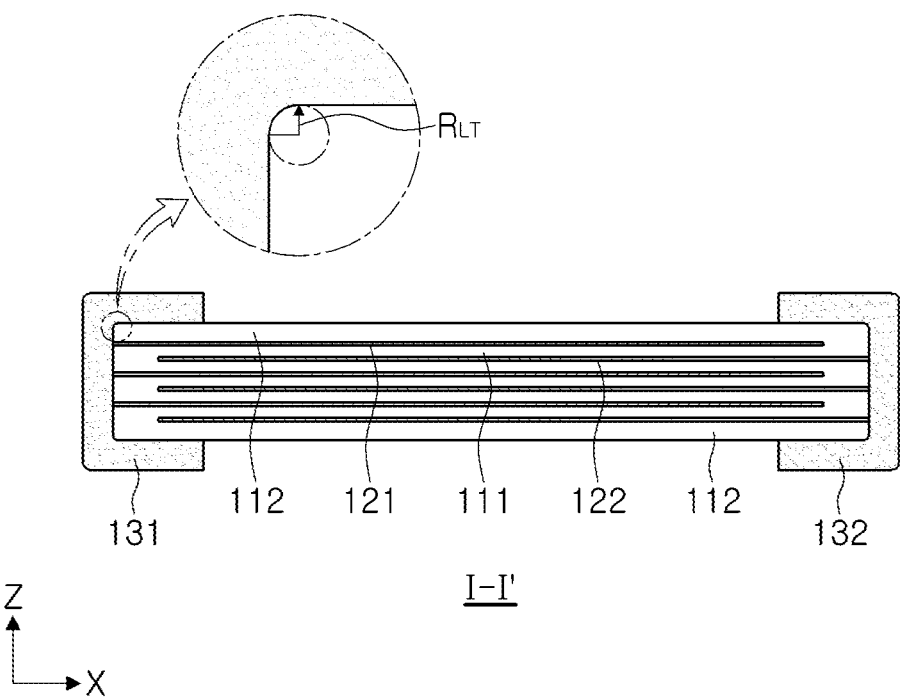
FIG. 3 is a cross-sectional diagram taken along line I-I' in FIG. 1.

FIG. 3 is a cross-sectional diagram taken along line I-I' in FIG. 1.

Figure 4:
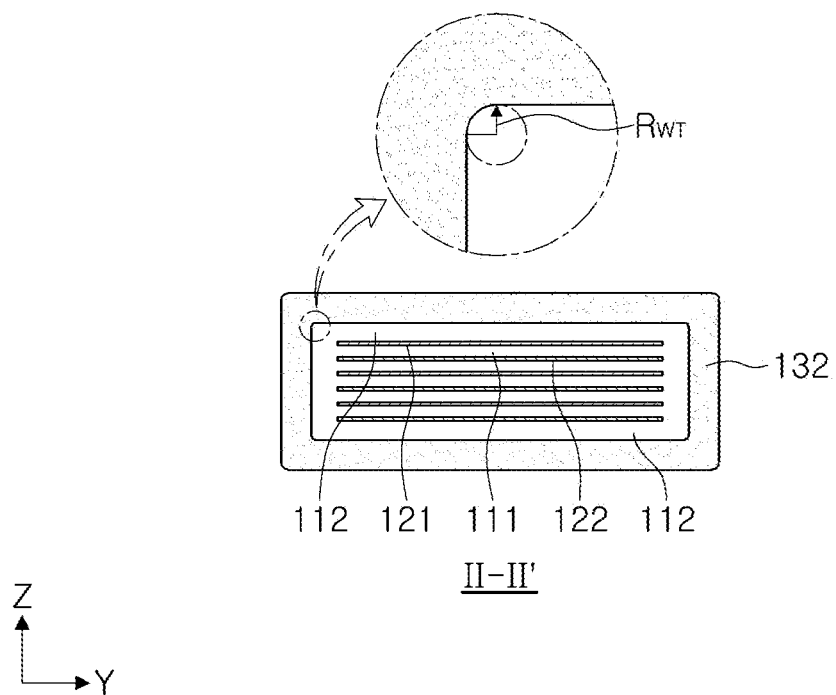
FIG. 4 is a cross-sectional diagram taken along line II-II' in FIG. 1.

FIG. 4 is a cross-sectional diagram taken along line II-II' in FIG. 1.

Figure 5:
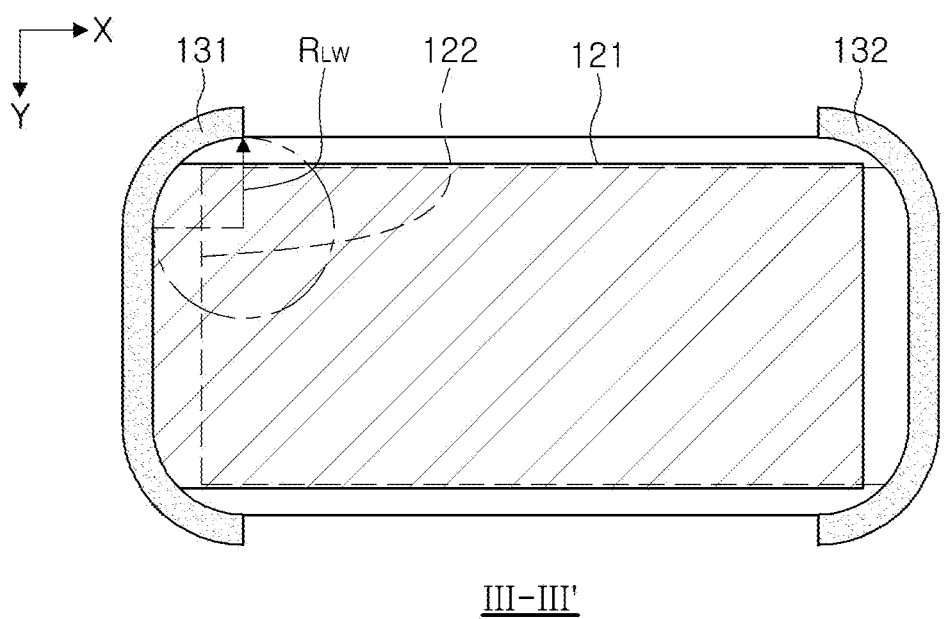
FIG. 5 is a cross-sectional diagram taken along line III-III' in FIG. 1.

FIG. 5 is a cross-sectional diagram taken along line III-III' in FIG. 1.

Referring to FIGS. 1 to 5, a capacitor component 100 according to an exemplary embodiment may include a body 110 including a dielectric layer 111, and a first internal electrode and a second internal electrode 121 and 122 opposing each other in a first direction (Z direction) with the dielectric layer interposed therebetween, and having first and second surfaces 1 and 2 opposing each other in the first direction (Z direction), third and fourth surfaces 3 and 4 connected to the first and second surfaces and opposing each other in a second direction (X direction), and fifth and sixth surfaces 5 and 6 connected to the first to fourth surfaces and opposing each other in a third direction (Y direction); and first and second external electrodes 131 and 132 disposed in an outer portion of the body and connected to the first and second internal electrodes 121 and 122, respectively. The body 110 has edges having a rounded shape, and when a radius of curvature on a surface in the second and third directions is defined as $R_{LW}$, a radius of curvature of an edge of a surface of the body in the first and second directions is defined as $R_{LT}$, a distance between the first and second surfaces of the body is defined as T, and a distance between flat portions of the fifth and sixth surfaces of the body is defined as W, $R_{LW}$ may be greater than $R_{LT}$, and $R_{LW}$ and $R_{LT}$ may satisfy $2.5*T/R_{LT} \leq R_{LW} \leq 0.25*W$. The distance W or the width W may be defined to be the distance between portions of the fifth and sixth surfaces of the body 110 parallel to each other, i.e., without considering the corner portions of the body 110.

In the body 110, the dielectric layer 111 and the internal electrodes 121 and 122 may be alternately layered.

A shape of the body 110 may not be limited to any particular shape, but as illustrated in the diagram, the body 110 may have a hexahedral shape or a shape similar to a hexahedron. Due to contraction of a ceramic powder included in the body 110 during a sintering process, the body 110 may have substantially a hexahedral shape although the hexahedral shape may not be an exact hexahedron formed by straight lines.

The body 110 may have first and second surfaces 1 and 2 opposing each other in the first direction (Z direction), third and fourth surfaces 3 and 4 connected to the first and second surfaces 1 and 2 and opposing each other in a second direction (X direction), and fifth and sixth surfaces 5 and 6 connected to the first and second surface 1 and 2 and the third and fourth surfaces 3 and 4 and opposing each other in a third direction (Y direction).

The plurality of dielectric layers 111 forming the body 110 may be in a sintered state, and the dielectric layers 111 may be integrated such that boundaries between adjacent dielectric layers 111 may be difficult to identify without using a scanning electron microscope (SEM).

A material of the dielectric layer 111 may not be limited to any particular material as long as sufficient capacitance can be obtained therewith. For example, a material of the dielectric layer 111 may be a barium titanate ($BaTiO_3$) powder. As the material of the dielectric layer 111, various ceramic additives, organic solvents, coupling agents, dispersing agents, and the like, may be added to a barium titanate ($BaTiO_3$) powder, or the like, depending on an intended purpose.

The internal electrodes 121 and 122 may be alternately layered with the dielectric layer 111 therebetween, and may include first and second internal electrodes 121 and 122. The first and second internal electrodes 121 and 122 may be alternately disposed with the dielectric layer 111 interposed therebetween, which forms the body 110, and oppose each other, and may be exposed to the third and fourth surfaces 3 and 4 of the body 110, respectively.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4.

In this case, the first and second internal electrodes 121 and 122 may be electrically separated from each other by the dielectric layer 111 interposed therebetween. The body 110 may be formed by layering a ceramic green sheet on which the first internal electrode 121 is printed, and a ceramic green sheet on which the second internal electrode 122 is printed, and performing a sintering process.

A material of the first and second internal electrodes 121 and 122 may not be limited to any particular material. The first and second internal electrodes 121 and 122 may be formed of a conductive paste comprised of one or more materials among palladium (Pd), palladium-silver (Pd—Ag) alloy, and the like, and nickel (Ni) and copper (Cu), for example.

As the printing method of the conductive paste, a screen printing method, a gravure printing method, or the like, may be used, but the method is not limited thereto.

The capacitor component 100 according to the exemplary embodiment may include a capacitance forming portion disposed in the body 110, forming capacitance, and including the first internal electrode 121 and the second internal electrode 122 disposed to oppose each other with the dielectric layer 111 interposed therebetween, and a cover portion 112 disposed on upper and lower portions of the capacitance forming portion.

The capacitance forming portion may contribute to forming capacitance of a capacitor, and may be formed by repeatedly layering a plurality of the first and second internal electrodes 121 and 122 with the dielectric layer 111 interposed therebetween.

The cover portion 112 may not include an internal electrode, and may include the same material as the material of the dielectric layer 111.

The cover portion 112 may include a ceramic material. For example, the cover portion 111 may include a barium titanate (BaTiO$_3$) ceramic material.

The cover portion 112 may be formed by disposing a single dielectric layer or layering two or more dielectric layers on upper and lower surfaces of the capacitance forming portion, and may prevent damage to an internal electrode caused by physical or chemical stress.

Meanwhile, a capacitor component may have the issue of chipping defects, breakage of edges of chips caused by collisions between chips during the process of manufacturing a multilayer ceramic capacitor. The chipping defects may cause exterior defects and degradation of moisture resistance reliability.

The chipping defects may occur because edges of a body are sharp. In the prior art, to prevent the chipping defects, edges of a body are ground to have a rounded shape.

However, the above method may have several limitations depending on a shape of a body in that radiuses of curvature of all edges are controlled in the same or similar manners.

Particularly, in the case of a low-profile multilayer ceramic capacitor having a low thickness, as a radius of curvature is large, shapes of both ends in a length direction become curved shapes, which may cause the problem when an external electrode is formed, and a possibility of short defects caused by exposure of an internal electrode may be increased.

In the exemplary embodiment, a rounded shape of an edge of a body may be controlled in an anisotropic manner, rather than by controlling radiuses of curvature of all the edges in the same or similar manner. As the shape of an edge is controlled as above, chipping defects may be prevented, there may be no problem in formation of an external electrode, and short defects caused by exposure of an internal electrode may be also prevented. Further, exterior defects may be prevented, and reliability may be improved.

More specifically, in the exemplary embodiment, when a radius of curvature on a surface in the second and third directions (L-W surface) is defined as $R_{LW}$ a radius of curvature of an edge of a surface of the body in the first and second directions (L-T surface) is defined as $R_{LT}$, a distance between the first and second surfaces of the body is defined as T, and a distance between flat portions of the fifth and sixth surfaces of the body is defined as W, $R_{LW}$ may be greater than $R_{LT}$, and $R_{LW}$ and $R_{LT}$ may satisfy $2.5*T/R_{LT} \leq R_{LW} \leq 0.25*W$. Accordingly, as mentioned above, the chipping defects may be prevented, there may be no problem in formation of an external electrode, and short defects caused by exposure of an internal electrode may be also prevented. Further, exterior defects may be prevented, and reliability may be improved.

When $R_{LW}$ is less than $2.5*T/R_{LT}$, there may be chipping defects, and when $R_{LW}$ is greater than $0.25*W$, short defects caused by exposure of an internal electrode may occur or it may be difficult to form an external electrode.

A method for implementing an anisotropic rounded shape of the body may not be limited to any particular method. For example, the process in which capacitor components are aligned, and edges of a body are ground in advance may be used.

When a ratio between W and T, W/T, is defined as an aspect ratio, the aspect ratio may be 4 or greater.

The greater the aspect ratio, the more effective the prevention of chipping defects and short defects described in the exemplary embodiment.

Particularly, as a low-profile multilayer ceramic capacitor having a body with a low thickness T is vulnerable to chipping defects, the effect of the prevention of chipping defects and short defects described in the exemplary embodiment may be more prominent. Thus, the thickness T may be 100 μm or less.

Also, when a distance between the third and fourth surfaces 3 and 4 of the body is defined as L, L may be 1000 μm or less, and W may be 500 μm or less.

Also, $R_{LW}$ and $R_{LT}$ may satisfy $2 \leq R_{LW}/R_{LT} \leq 100$. More desirably, $R_{LW}$ and $R_{LT}$ may satisfy $5 \leq R_{LW}/R_{LT} \leq 100$.

Referring to FIG. 4, when a radius of curvature of an edge of a surface of the body in the first and third directions (W-T surface) is defined as $R_{WT}$, $R_{WT}$ may satisfy $2.5*T/R_{WT} \leq R_{LW}$, and $R_{WT}$ and $R_{LT}$ may satisfy $0.9 \leq R_{WT}/R_{LT} \leq 1.1$.

In other words, a radius of curvature of an edge of a surface of the body in the first and third directions may have the same as or similar to $R_{LT}$.

The external electrodes 131 and 132 may be disposed on the body 110, and may be connected to the internal electrodes 121 and 122. As illustrated in FIG. 3, the external electrodes 131 and 132 may include the first and second external electrodes 131 and 132 connected to the first and second internal electrodes 121 and 122, respectively. In the exemplary embodiment, the capacitor component 100 may have two external electrodes 131 and 132, but the number and a shape of the external electrodes 131 and 132 may vary depending on a shape of the internal electrodes 121 and 122 or other intended purpose.

Meanwhile, a material of the external electrodes 131 and 132 may not be limited to any particular material as long as the material has an electrical conductivity, such as metal, and the material may be determined considering electrical properties, structural stability, and the like. The external electrodes 131 and 132 may also have multiple layers.

For example, the external electrodes 131 and 132 may include an electrode layer disposed on the body 110 and a plating layer disposed on the electrode layer.

The electrode layer may be, for example, a sintered layer including a conductive metal and glass, and the conductive metal may be Cu. Also, the electrode layer may be a resin electrode including a plurality of metal particles and conductive resin.

As another example, the plating layer may be an Ni plated layer or an Sn plated layer. In this case, the Ni plated layer and the Sn plated layer may be sequentially formed on the electrode layer, and a plurality of the Ni plated layers and the Sn plated layers may be included.

The embodiment relates to examinations of the presence of chipping defects and exposure of an internal electrode depending on changes in radius of curvature $R_{LW}$ of an edge of a surface of the body in the second and third directions (L-W surface), radius of curvature $R_{LT}$ of an edge of a surface of the body in the first and second directions (L-T surface), and size of the body.

In Table 1 below, a length L, a width W, and a thickness T of the body were 1000 μm, 500 μm, and 80 μm, respectively, and an aspect ratio of the body, W/T, was 6.25.

In Table 2 below, a length L, a width W, and a thickness T of the body were 600 μm, 300 μm, and 70 μm, respectively, and an aspect ratio of the body, W/T, was 4.29.

In Table 1 and Table 2, $R_Lw$ may refer to a radius of curvature of an edge of a surface of the body in the second and third directions (L-W surface), and $R_{LT}$ may refer to a radius of curvature of an edge of a surface of the body in the first and second directions (L-T surface).

As for the exposure of an electrode, samples in which the first internal electrode 121 was exposed to the fourth surface 4, or the second internal electrode 122 was exposed to the third surface 3 were indicated as 'NG'. Samples in which there was no exposure of an electrode were indicated as 'OK'.

As for the chipping defects, samples in which chipping defects were observed by the optical microscope were indicated as 'NG', and samples in which there were no chipping defects were indicated as 'OK'.

TABLE 1

| Sample No. | $R_{LT}$ (μm) | $R_{LW}$ (μm) | 2.5 * T/$R_{LT}$ | $R_{LW}$/W | Chipping Defects | Exposure of Electrode |
|---|---|---|---|---|---|---|
| 1* | 8 | 10 | 25 | 0.02 | NG | OK |
| 2* | 8 | 20 | 25 | 0.04 | NG | OK |
| 3 | 8 | 30 | 25 | 0.06 | OK | OK |
| 4 | 8 | 40 | 25 | 0.08 | OK | OK |
| 5 | 8 | 70 | 25 | 0.14 | OK | OK |
| 6 | 8 | 100 | 25 | 0.2 | OK | OK |
| 7 | 8 | 120 | 25 | 0.24 | OK | OK |
| 8* | 8 | 140 | 25 | 0.28 | OK | NG |
| 9* | 4 | 10 | 50 | 0.02 | NG | OK |
| 10* | 4 | 20 | 50 | 0.04 | NG | OK |
| 11* | 4 | 30 | 50 | 0.06 | NG | OK |
| 12* | 4 | 40 | 50 | 0.08 | NG | OK |
| 13 | 4 | 70 | 50 | 0.14 | OK | OK |
| 14 | 4 | 100 | 50 | 0.2 | OK | OK |
| 15 | 4 | 120 | 50 | 0.24 | OK | OK |
| 16* | 4 | 140 | 50 | 0.28 | OK | NG |

*Comparative Example

TABLE 2

| Sample No. | $R_{LT}$ (μm) | $R_{LW}$ (μm) | 2.5 * T/$R_{LT}$ | $R_{LW}$/W | Chipping Defects | Exposure of Electrode |
|---|---|---|---|---|---|---|
| 17* | 6 | 10 | 29.17 | 0.03 | NG | OK |
| 18* | 6 | 20 | 29.17 | 0.07 | NG | OK |
| 19 | 6 | 30 | 29.17 | 0.1 | OK | OK |
| 20 | 6 | 45 | 29.17 | 0.15 | OK | OK |
| 21 | 6 | 60 | 29.17 | 0.2 | OK | OK |
| 22* | 6 | 80 | 29.17 | 0.27 | OK | NG |
| 23* | 6 | 100 | 29.17 | 0.33 | OK | NG |
| 24* | 4 | 10 | 43.75 | 0.03 | NG | OK |
| 25* | 4 | 20 | 43.75 | 0.07 | NG | OK |
| 26* | 4 | 30 | 43.75 | 0.1 | NG | OK |
| 27 | 4 | 45 | 43.75 | 0.15 | OK | OK |
| 28 | 4 | 60 | 43.75 | 0.2 | OK | OK |
| 29* | 4 | 80 | 43.75 | 0.27 | OK | NO |
| 30* | 4 | 100 | 43.75 | 0.33 | OK | NO |

*Comparative Example

In samples 1, 2, 9 to 12, 17, 18, and 24 to 26, $R_{LW}$ was less than 2.5*T/$R_{LT}$. In these samples, $R_{LW}$ and $R_{LT}$ did not satisfy 2.5*T/$R_{LT}$≤$R_{LW}$, and the chipping defects occurred.

In samples 8, 16, 22, 23, 29, and 30, $R_{LW}$/W exceeded 0.25. In these samples, $R_{LW}$ and W did not satisfy $R_{LW}$≤0.25*W, and the exposure of an electrode occurred.

When $R_{LW}$, $R_{LT}$, and W satisfy 2.5*T/$R_{LT}$≤$R_{LW}$≤0.25*W, there has been no chipping defects or exposure of an internal electrode. Thus, as $R_{LW}$, $R_{LT}$, and W satisfy 2.5*T/$R_{LT}$≤$R_{LW}$≤0.25*W, chipping defects may be prevented, there may be no problem when an external electrode is formed, and short defects caused by exposure of an internal electrode may be prevented.

According to the aforementioned exemplary embodiments, by controlling a rounded shape of edges of a body, chipping defects may be prevented.

While the exemplary embodiments have been shown and described above, it will be apparent to those skilled in the art that modifications and variations could be made without departing from the scope of the present invention as defined by the appended claims.

What is claimed is:

1. A capacitor component, comprising:
    a body including a dielectric layer, and a first internal electrode and a second internal electrode opposing each other in a first direction of the body with the dielectric layer interposed therebetween, and having first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body; and
    first and second external electrodes disposed on the body and connected to the first and second internal electrodes, respectively,
    wherein the body has edges having a rounded shape, and $R_{LW}$ is greater than $R_{LT}$, and $R_{LW}$ and $R_{LT}$ satisfy 2.5*T/$R_{LT}$≤$R_{LW}$≤0.25*W, in which $R_{LW}$ is defined as a radius of curvature of an edge of a surface of the body in the second and third directions, $R_{LT}$ is defined as a radius of curvature of an edge of a surface of the body in the first and second directions, T is defined as a distance between the first and second surfaces of the body, and W is defined as a distance between the fifth and sixth surfaces of the body.

2. The capacitor component of claim 1, wherein a ratio between W and T, W/T, is defined as an aspect ratio, and the aspect ratio is 4 or greater.

3. The capacitor component of claim 1, wherein T is 100 μm or less.

4. The capacitor component of claim 1, wherein $R_{LW}$ and $R_{LT}$ satisfy 2≤$R_{LW}$/$R_{LT}$≤100.

5. The capacitor component of claim 1, wherein T, $R_{WT}$ and $R_{LW}$ satisfy 2.5*T/$R_{WT}$≤$R_{LW}$, in which $R_{WT}$ is defined as a radius of curvature of an edge of a surface of the body in the first and third directions.

6. The capacitor component of claim 5, wherein $R_{WT}$ and $R_{LT}$ satisfy 0.9≤$R_{WT}$/$R_{LT}$≤1.1.

7. The capacitor component of claim 1, wherein a distance L between the third and fourth surfaces of the body is 1000 μm or less, and W is 500 μm or less.

8. The capacitor component of claim 1, wherein the first external electrode is disposed on the third surface of the body, and the second external electrode is disposed on the fourth surface of the body.

9. The capacitor component of claim 1, wherein $R_{LW}$ is 30 μm or greater.

10. The capacitor component of claim 1, wherein a portion of each of the first internal electrode and the second internal electrode is exposed from a portion of the edge of the surface of the body in the second and third directions having the radius of curvature of $R_{LW}$.

11. The capacitor component of claim 10, wherein each of the first internal electrode and the second internal electrode is spaced apart from the edge of the surface of the body in the first and second directions having the radius of curvature of $R_{LT}$.

* * * * *